INTERLACE CONTROL FOR TELEVISION PICTURES

Filed Feb. 27, 1950 2 Sheets-Sheet 1

Inventor
Allen R. Davidson

By
Ralph Hammar
Attorney

INTERLACE CONTROL FOR TELEVISION PICTURES

Filed Feb. 27, 1950 2 Sheets-Sheet 2

Allen R Davidson Inventor

By Ralph Hammar Attorney

Patented Aug. 3, 1954 2,685,610

UNITED STATES PATENT OFFICE 2,685,610

INTERLACE CONTROL FOR TELEVISION PICTURES

Allen R. Davidson, Erie, Pa.

Application February 27, 1950, Serial No. 146,485

2 Claims. (Cl. 178—7.5)

In television it is desirable that alternate scanning fields be so controlled that all horizontal lines in a completed frame are equally spaced, e. g., in the first field lines 1, 3, 5, and all odd lines are scanned; in the next field, lines 2, 4, 6, and all even lines are scanned thus completing a picture frame. The spacing between lines 1 and 2, 2 and 3, 3 and 4, etc., are required to be equal by definition of interlacing. Difficulty has been experienced in obtaining interlaced picture patterns in television receivers. This invention is intended to produce reliable interlacing of the received picture patterns using the present television transmitting stations. Further objects and advantages appear in the specification and claims.

Figure 1:
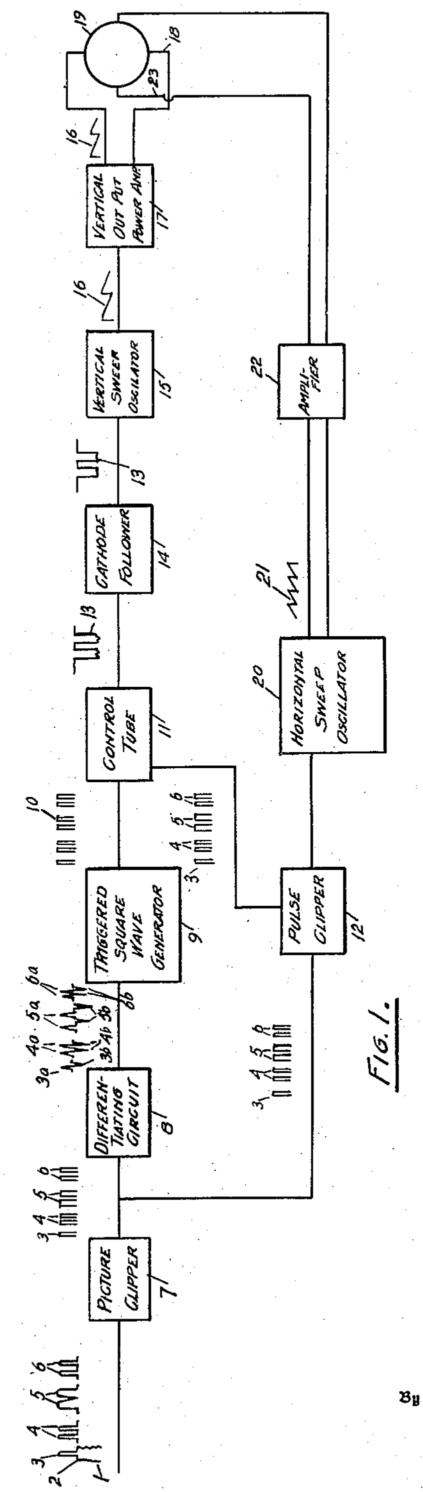
Figure 3:
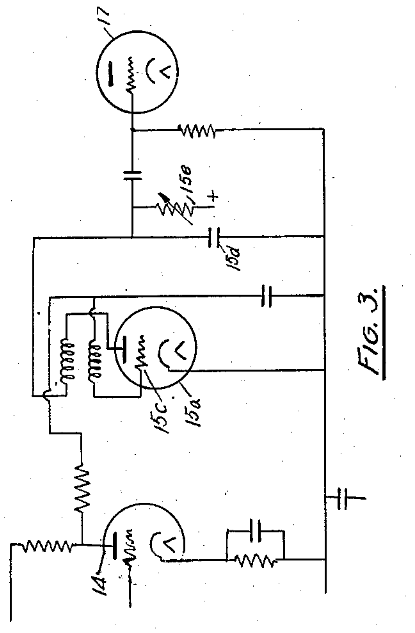
Figure 2:
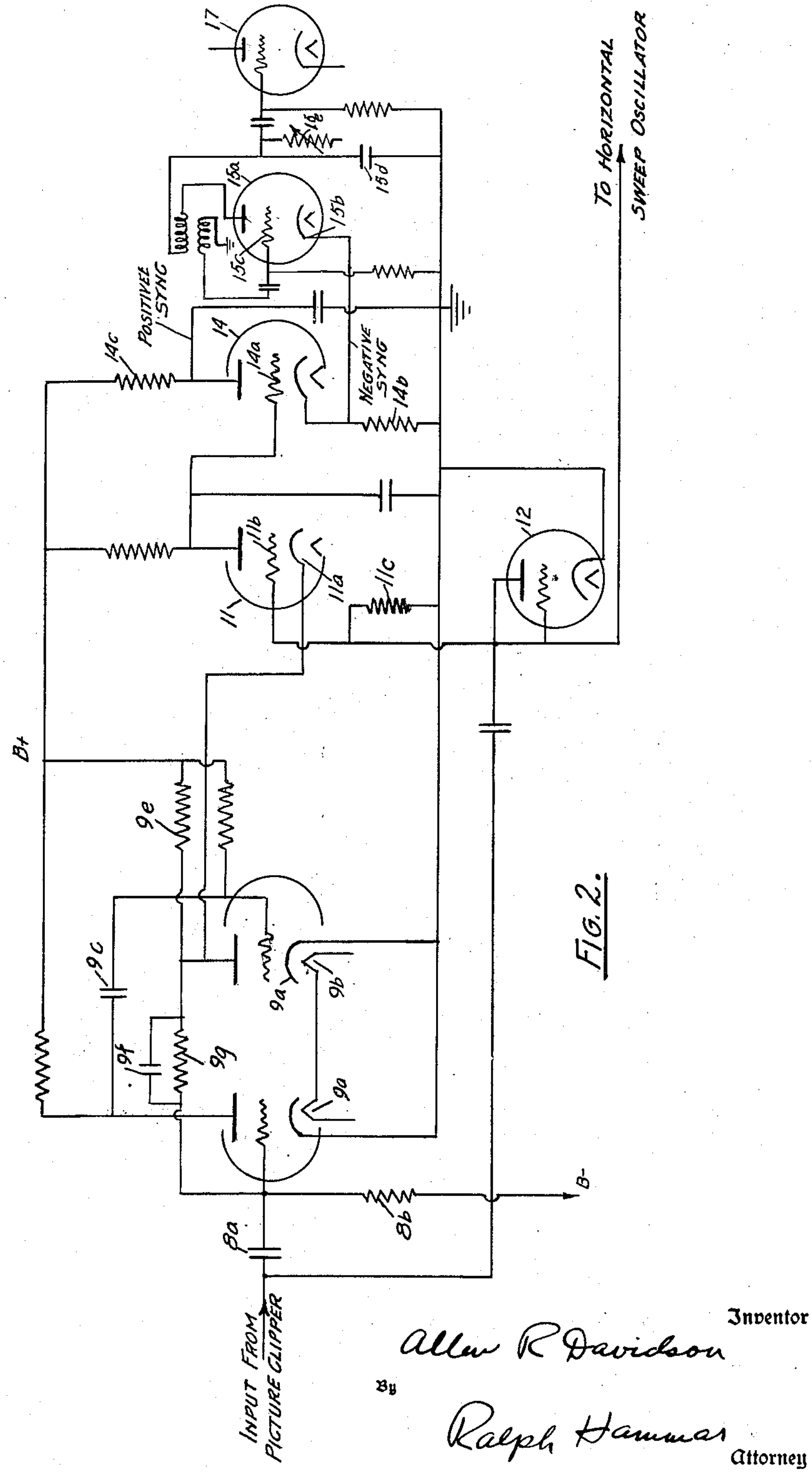

In the drawing, Fig. 1 is a diagrammatic view of a television receiving circuit equipped with an interlace control, Fig. 2 is a circuit diagram of the interlace control, and Fig. 3 is a circuit diagram of another type of vertical sweep oscillator for use with the Fig. 2 circuit diagram.

In the standard television broadcast, the horizontal or line synchronizing pulses are at the rate of 15,750 per second and are spaced so as to provide adjacent picture fields which, when interlaced, would form a pattern of 525 lines as a theoretical maximum. The picture signals indicated at 1 have an amplitude carrying the picture information in the center of which is a pedestal 2 on which is superimposed a horizontal synchronizing pulse 3. At the end of each picture pattern there is a series of six equalizing pulses 4 followed by a series of six serrated vertical synchronizing pulses 5 and then another series of six equalizing pulses 6. The equalizing pulses and the serrated pulses are at the same level as the synchronizing pulses. The equalizing and serrated pulses are alternately shifted one half the spacing between the horizontal lines on the picture pattern. The equalizing and serrated pulses between adjacent picture fields are staggered so that two picture fields are produced, in each of which the horizontal lines are interlaced if the information transmitted by the vertical serrated pulses 5 is accurately reproduced in the television receiver. The equalizing pulses 4 and 6 are to provide consistent horizontal pulse information during the vertical synchronizing interval. The equalizing pulses are also necessary when the conventional integrating circuit is employed for vertical synchronizing to provide consistent amplitude at the start of the integrating process.

The television picture signals are fed through a picture clipper 7 which removes all of the picture information and passes only the line synchronizing pulses 3, the equalizing pulses 4 and 6, and the vertical synchronizing serrated pulses 5.

The output of the picture clipper is fed to a differentiating circuit which produces in its output positive peaks 3*a*, 4*a*, 5*a*, and 6*a* corresponding to the beginning of the synchronizing, equalizing, and serrated pulses 3, 4, 5, and 6. The differentiating circuit also produces negative peaks 3*b*, 4*b*, 5*b*, and 6*b* corresponding to the ends of the correspondingly numbered pulses. The negative peaks 3*b*, 4*b*, 5*b*, and 6*b* are ineffective. The positive peaks 3*a*, 4*a*, 5*a*, and 6*a* fire a triggered square wave generator 9 which, at each firing, produces in its output positive square waves or control or deletion pulses 10 of longer duration than the synchronizing and equalizing pulses 3, 4, and 6, but of shorter duration than the vertical serrated pulses 5. These square waves or control or deletion pulses 10 are fed to a normally negatively biased control tube 11 in the sense to over bias the tube. The output from the picture clipper 7 is fed through a pulse clipper 12 (which equalizes the height of the pulses) to the control tube 11. The over biasing effect exists for the duration of the square waves or control or deletion pulse 10. In a practical circuit, the duration of the square waves or control or deletion pulse 10 will be of the order of six micro-seconds, whereas the duration of the synchronizing and equalizing pulses 3, 4, and 6 will be of the order of five micro-seconds. This means that the synchronizing and equalizing pulses will have no appreciable effect upon the control tube 11. However, the vertical serrated pulses 5 which have a duration of the order of twenty seven micro-seconds will cause the control tube 11 to conduct during the last twenty one micro-seconds of each of the pulses. The output of the control tube 11 accordingly consists of pulses 13 of approximately twenty one micro-seconds duration and corresponding with the vertical serrated pulses 5. The output of the control tube 11 is fed through a cathode follower 14 to a vertical blocking oscillator 15 which generates the saw-tooth wave 16 which is fed through a power amplifier 17 to the vertical input 18 of a picture tube 19. The synchronizing output of the cathode follower 14 is negative. If a positive synchronizing output is required, 14 can be a triode amplifier.

The pulse clipper 12 also feeds a horizontal synchronizing oscillator 20 which produces a saw-tooth wave 21 which is fed through an amplifier 22 to the horizontal input 23 of the picture tube. The horizontal sweep is conventional.

From one aspect the control for the vertical sweep oscillator is responsive to the width of the pulses. The narrow synchronizing and equalizing pulses 3, 4, and 6 are of insufficient duration to pass control tube 11 and control the vertical sweep oscillator 15. The wider or longer duration vertical serrated pulses 5 are effective to fire the vertical sweep oscillator in synchronism with the pulses 5. Of course, the vertical sweep oscillator can be fired only once so only the first of the pulses 5 is effective.

The interlace control requires no change in television transmission. The vertical sweep oscillator fires on the first of the six vertical serrated pulses now transmitted and since the pulses following consecutive picture patterns are synchronized one half the spacing between the picture lines, consecutive picture patterns are interlaced. In other words, two consecutive fields in effect form one frame with twice the line density.

Because of the reliability, it is not necessary to have the equalizing pulses 4 and 6 nor is it necessary to have more than one vertical serrated pulse between each pattern. This would permit the transmission of more picture information should the television transmission be changed to eliminate the unnecessary equalizing and vertical serrated pulses.

Another advantage is the elimination of the vertical hold control now present on television receivers.

From one aspect, the interlace control is responsive to pulse width. The narrow synchronizing and equalizing pulses are blocked and have no effect. The first of the wide vertical serrated pulses fires the vertical sweep oscillator thereby positively synchronizing the consecutive picture patterns.

In the circuit diagram, the differentiating circuit 8 comprises a condenser 8*a* and a resistance 8*b* across which the peaks 3*a*—6*b* appear. The square wave generator triggered by the peaks 3*a*, 4*a*, 5*a*, 6*a* comprises a double triode 9*a*, 9*b*, 9*b* being normally on and 9*a* being normally off and triggered on by the peaks 3*a*, 4*a*, 5*a*, 6*a*. The drop in voltage upon the firing of 9*a* is coupled through condenser 9*c* to the grid 9*d* of 9*b* to bias 9*b* off and cause an abrupt rise in voltage at resistance 9*e*. After an interval of about 6 microseconds, the grid bias of tube 9*b* rises to a point at which tube 9*b* fires causing an abrupt drop in voltage at resistance 9*e* which is coupled to the tube 9*a* to turn it off. The duration of the abrupt square wave increase in voltage (control or deletion pulse) 10 at the resistance 9*e* is determined by the circuit constants. The value of 6 microseconds is chosen for this application because that is longer than the duration of the synchronizing and equalizing pulses 3, 4, 6 and shorter than the vertical serrated pulse 5. A 50 micro micro farad condenser 9*f* across the resistance 9*g* in the feed back from the plate of the tube 9*b* to the grid of the tube 9*a* will increase the steepness of the lagging slope of the square wave 10 and eliminate a small initial pulse in the negative direction at the beginning of the square wave.

The square wave or control or deletion pulse 10 generated at each of the pulses 3, 4, 5, 6 is fed to the cathode 11*a* of a control or comparison tube 11 normally biased to cut off. Being positive, this biases the tube to cut off. The pulses 3, 4, 5, 6 are also fed through the diode pulse clipper 12 to the grid 11*b* of the control tube. The pulses fed through the clipper 12 are of insufficient magnitude to overbalance the negative bias due to the square wave control or deletion pulses 10 but are sufficient to fire the control tube 11 in the absence of a negative bias from the square wave control or deletion pulses 10. Since the square wave control or deletion pulses 10 are all of the same width, the control tube 11 is fired only during the latter part of the vertical serrated pulse 5. For the numerical values given, the control tube 11 is biased off for 6 micro-seconds which is longer than the 5 micro-second pulses 3, 4, and 6, and is 21 micro-seconds less than the 27 micro-second vertical serrated pulses 5. The control tube 11 accordingly fires during the last 21 micro-seconds of each of the vertical serrated pulses 5.

The output of the control tube 11, which is synchronized with the vertical serrated pulses 5, is fed to the grid 14*a* of the cathode follower 14 having a cathode resistor 14*b* across which a negative synchronizing pulse appears and having a plate resistor 14*c* across which a corresponding positive synchronizing pulse appears and which may be used with the blocking oscillator shown in Fig. 3. The blocking oscillator controlled by the negative synchronizing pulses from the cathode follower 14 comprises a tube 15*a* having its cathode 15*b* directly coupled to the negative synchronizing pulses appearing across the cathode resistor 14*b*. The direct coupling has a sharp wave form which is important for accurate control of the blocking oscillator. Saw tooth voltage appears across a condenser 15*d* which is charged through a resistance 15*e*. As the voltage on the condenser 15*d* increases, the grid 15*c* becomes more positive so that upon the arrival of the negative synchronizing pulse at the cathode 15*b*, the condenser 15*d* is quickly discharged. Grid current in the tube 15*a* biases the tube off and the charging of the condenser 15*d* through the resistor 15*a* starts again, producing the desired saw tooth wave form. 17 indicates the conventional amplifier tube to which the saw tooth wave form is coupled. Once the tube 15*a* has started to conduct and discharge the condenser 15*d*, the tube is not susceptible to external control. This makes it important that the tube 15*a* be fired synchronously with the vertical serrated pulses so that the saw tooth voltage generated across the condenser 15*d* will be accurately synchronized with the transmitted picture patterns. In the present circuit the precise synchronization is obtained since the tube 15*a* is always fired in synchronism with the first of the vertical serrated pulses 5. This insures the reproduction in the television receiver of the interlaced picture patterns transmitted.

While the equalizing pulses 4 and 6 and all but the first of the vertical serrated pulses 5 are unnecessary, the presence of these added pulses does not interfere with the operation of the present interlace control.

Receivers equipped with the present interlace control can be used without any change of the present television broadcast where consecutive interlaced transmitted picture patterns are separated by wide transmitted pulses for synchronizing the receiver so the receiver will reproduce the interlaced transmitted picture patterns.

The output of the described interlace control circuit is negative synchronizing for direct coupling to the blocking oscillator cathode. This method preserves the synchronizing pulse wave form for precise control. Positive synchronizing for control of other types of controlled saw tooth oscillators may be secured by using 14 as a triode amplifier for phase reversal instead of as a cathode follower as shown. The circuit diagram accomplishing this is shown in Fig. 3 where the positive synchronizing pulses appearing at the plate of the tube 14 are coupled to the grid 15c of the blocking oscillator tube 15a. The arrival of the positive pulses causes the tube 15a to conduct and to short circuit the condenser 15d across which the saw tooth voltage appears. In other respects the operation is the same as in the Fig. 2 circuit.

In some vertical sweep circuits the control tube 11 and the cathode follower 14 can be omitted and the vertical sweep circuit fed directly from the square wave generator 9 and the pulse clipper 12. This is possible where the sweep circuit design permits synchronizing without intermediate amplification. For example, with a multi-vibrator sweep generator, the output of the square wave generator 9 will supply a positive pulse 10 to the cathode while the synchronizing input from the pulse clipper 12 is being injected into the grid. Horizontal and equalizing pulses 2, 4, and 6 are over biased by the square wave pulses 10 even though the grid has a positive pulse applied. The vertical serrated pulses are only blanked off for the 6 micro second interval corresponding to the duration of the square wave pulses 10 and the balance of the 21 micro seconds applies the trip pulse.

What I claim as new is:

1. In a television receiver for television signals having interlaced patterns of horizontal lines separated by vertical synchronizing pulses of greater width than the line synchronizing pulses, said vertical synchronizing pulses being synchronized so consecutive patterns of horizontal lines interlace, means responsive to each of the pulses for producing deletion pulses of less width than the vertical synchronizing pulses but of greater width than the line synchronizing pulses, a vertical sweep circuit, and means for synchronizing the vertical sweep circuit including comparison means fed in opposed relation by said input pulses and by said deletion pulses, the input pulses being fed to the comparison means in the sense to synchronize the vertical sweep circuit and the deletion pulses being fed to the comparison means in the sense to block synchronizing of the vertical sweep circuit whereby the vertical sweep circuit is synchronized by the excess of width of the vertical synchronizing pulses as compared to the deletion pulses.

2. In a television receiver for television signals having interlaced patterns of horizontal lines separated by vertical synchronizing pulses of greater width than the line synchronizing pulses, said vertical synchronizing pulses being synchronized so consecutive patterns of horizontal lines interlace, a vertical sweep circuit oscillator synchronization circuit comprising a comparison control tube for synchronizing the vertical sweep circuit when the tube is biased on, means for feeding the vertical synchronizing and line synchronizing pulses to the comparison control tube in the sense to bias the tube on, square wave generator means for producing control pulses of less width than the vertical synchronizing pulses but of greater width than the line synchronizing pulses, means for triggering the square wave generator means from the leading edge of each of the vertical synchronizing and line synchronizing pulses and for rendering the square wave generating means independent of the remainder of said vertical synchronizing and line synchronizing pulses following the leading edges, means coupling the control pulses produced by the square wave generator means to the comparison tube in the sense to bias the tube off, means for coupling the vertical synchronizing and line synchronizing pulses to the comparison tube in the sense to bias the tube on, said control pulses produced by the square wave generator means being of sufficient magnitude to hold the comparison control tube off for the duration of the control pulses whereby the comparison tube is biased on to synchronize the vertical sweep oscillator during that portion of the vertical synchronizing pulses which exceeds the duration of the control pulses produced by the square wave generator means.

References Cited in the file of this patent

UNITED STATES PATENTS

| Number | Name | Date |
|---|---|---|
| 2,286,450 | White et al. | June 6, 1942 |
| 2,487,682 | Wendt | Nov. 8, 1949 |
| 2,491,804 | Fleming et al. | Dec. 20, 1949 |
| 2,508,923 | Mautner | May 23, 1950 |
| 2,548,219 | Jenkins | Apr. 10, 1951 |
| 2,570,775 | De Baun | Oct. 9, 1951 |

FOREIGN PATENTS

| Number | Country | Date |
|---|---|---|
| 845,351 | France | Aug. 21, 1939 |

OTHER REFERENCES

"Communications" for July, 1938, pages 5–8.